Oct. 18, 1966   D. S. CHISHOLM ETAL   3,279,161
METHOD AND APPARATUS FOR COATING STRANDULAR MATERIAL
Filed Feb. 5, 1964   2 Sheets-Sheet 1
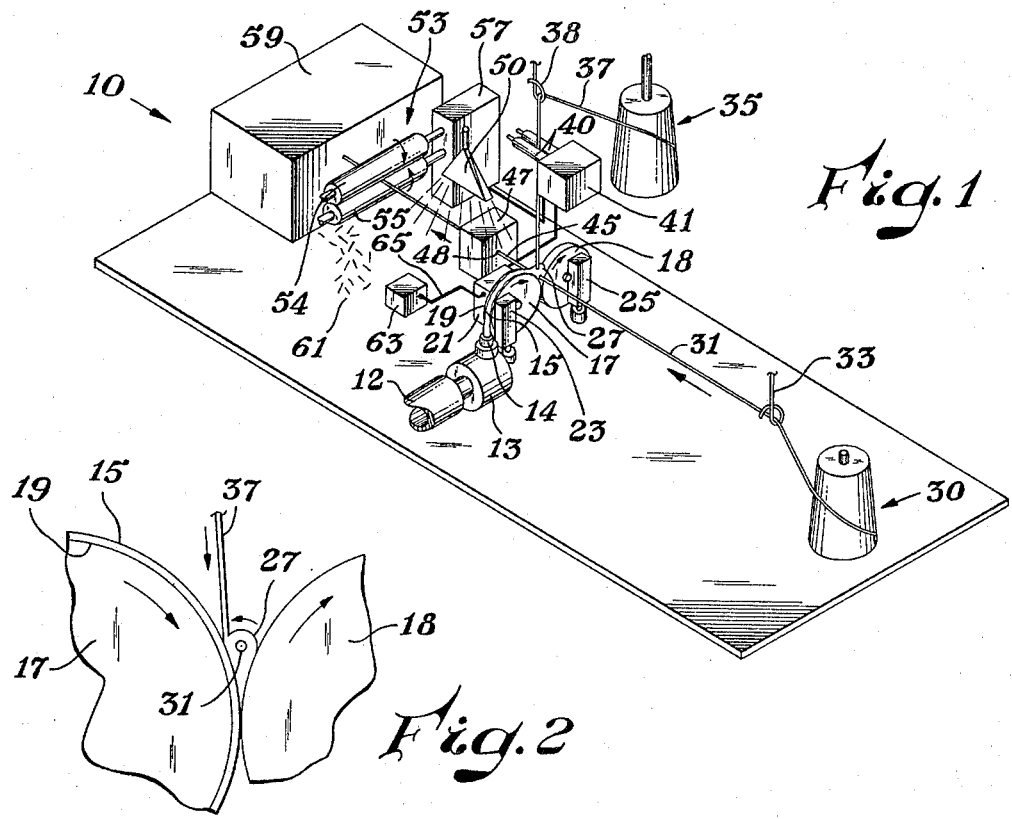
Fig.1
Fig.2
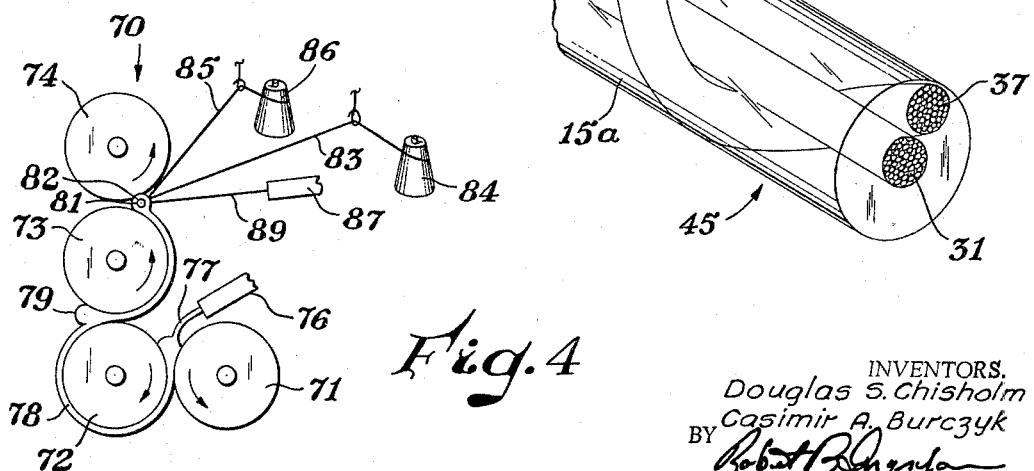
Fig.3
Fig.4
INVENTORS.
Douglas S. Chisholm
Casimir A. Burczyk
BY
AGENT
ATTORNEY Oct. 18, 1966   D. S. CHISHOLM ETAL   3,279,161
METHOD AND APPARATUS FOR COATING STRANDULAR MATERIAL
Filed Feb. 5, 1964   2 Sheets-Sheet 2
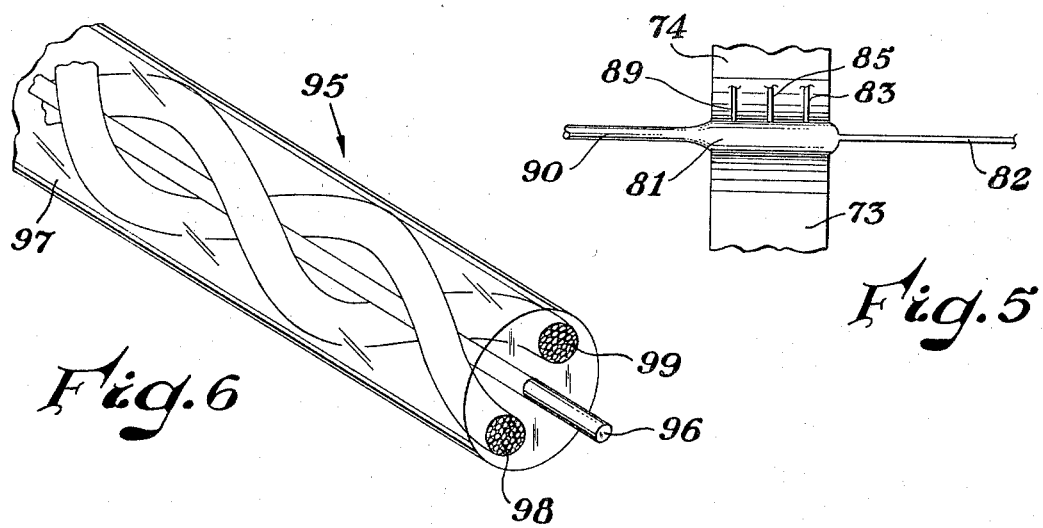
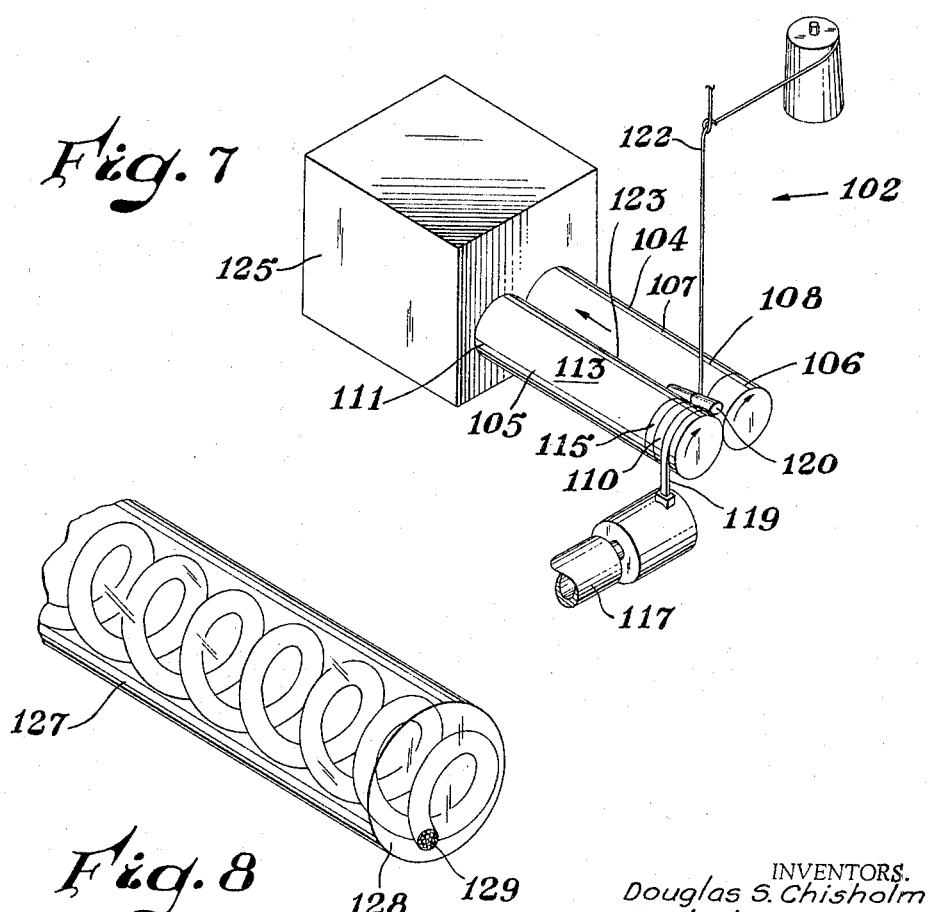
INVENTORS.
Douglas S. Chisholm
Casimir A. Burczyk
BY
AGENT
ATTORNEY

United States Patent Office 3,279,161
Patented Oct. 18, 1966

3,279,161
METHOD AND APPARATUS FOR COATING
STRANDULAR MATERIAL
Douglas S. Chisholm and Casimir A. Burczyk, Midland, Mich., assignors to The Dow Chemical Company, Midland, Mich., a corporation of Delaware
Filed Feb. 5, 1964, Ser. No. 342,664
14 Claims. (Cl. 57—35)

This invention relates to plastic processing. It more particularly relates to an improved method and apparatus for the incorporation of filamentary articles into a strandular thermoplastic resinous body.

Many techniques have been utilized to incorporate filamentary material within a thermoplastic resinous body. Such techniques include passing of the filamentary article to be coated through a molten bath of a coating material, through lacquers of solutions of the polymer to be deposited and also through aqueous dispersions which are subsequently dried to provide a coated article. Such coated articles have many applications. One of the more commercially important of such coated articles is a granule or particle having embedded within a thermoplastic resinous matrix a plurality of glass filaments. Such particles are used for molding of glass fiber reinforced shaped articles. Usually to prepare such articles which are satisfactory for conventional molding procedures, relatively complex equipment must be utilized and production rates are frequently relatively slow. Such molding granules generally are often prepared by fabricating a coated strand and then cutting it into granules of the desired length. Frequently, for molding operations, it is desirable to have incorporated in the strand fibers or filaments having a curved configuration. On molding of granules containing parallel fibers, these are frequently strained and broken, consequently losing a portion of the reinforcing value. It is desirable to incorporate into the granule filaments in a curved configuration which are less subject to breakage under molding conditions than are filaments which lie on a generally straight line. In preparing strandular articles oftentimes it is desirable to incorporate a generally helically disposed reinforcement or indicator therein. This is oftentimes achieved by relatively complicated mechanical devices which serve to rotate the source of the filamentary material about the strandular article or at least about a central core during the preparation of the strandular article.

An object of this invention is to provide an improved method and apparatus for the preparation of elongate strandular articles having a generally helically disposed element therein.

It is also an object of this invention to provide an apparatus for the coating of a strandular article with a thermoplastic resinous material having a helically wound element within the coating.

A further object of this invention is to provide a simplified method for wire coating.

Another object of the invention is to provide an improved molding granule and method for the preparation thereof.

These benefits and other advantages in accordance with the method of the present invention are achieved by providing a rolling bank of a heat plastified thermoplastic resinous material between a pair of adjacent rolls, introducing a first strand of material tangentially into the bank and simultaneously withdrawing a second strand of thermoplastic material from the bank. The relative feed rates of thermoplastic resinous material to the rolling bank, and the feed rates of the first strand and resinous material being maintained in such relationship that the first strand forms a helix in the second strand.

The apparatus in accordance with the present invention comprises in cooperative combination a pair of rolls, the rolls rotating on generally parallel axes, a portion of the external cylindrical surface of the rolls being in spaced adjacent relationship, means to rotate the rolls in like directions, means to maintain the rolls at a desired temperature, means to supply a thermoplastic resinous material to at least one of the rolls, means to supply a strandular article in a direction generally normal to the direction of the axis of rotation of the rolls, the apparatus being so constructed and arranged so that when thermoplastic resinous material is fed to the rolls, the strandular article is incorporated into a second strandular article having the first strandular article helically disposed within the thermoplastic resinous material.

Also within the scope of the present invention is a thermoplastic resinous particle having an elongated shape, a strandular member helically disposed within a thermoplastic resinous matrix.

Further features and advantages of the present invention will become more apparent from the following specification when taken in connection with the drawing wherein:

FIGURE 1 schematically depicts a method and apparatus of the present invention;

FIGURE 2 is an enlarged partial section illustrating the operation of the apparatus of FIGURE 1;

FIGURE 3 is an isometric view of a particle or portion of a strand prepared by the apparatus of FIGURE 1;

FIGURE 4 represents an alternate apparatus and method in accordance with the invention;

FIGURE 5 is a view of a portion of the apparatus of FIGURE 4;

FIGURE 6 is a cutaway view of a wire insulated by apparatus in accordance with the invention;

FIGURE 7 is a schematic illustration of an alternate method and apparatus in accordance with the invention;

FIGURE 8 is a view of a portion of the strand prepared by the apparatus of FIGURE 7.

In FIGURE 1 there is illustrated schematically an apparatus generally designated by the reference numeral 10, for the preparation of elongate coated strandular bodies. The apparatus 10 comprises in cooperative combination a supply means or extruder 12. The extruder 12 has a die 13, having an orifice 14. A heat plastified thermoplastic resinous ribbon 15 is extruded from the orifice 14. A pair of rolls 17 and 18 are disposed adjacent the orifice 14 of the extruder 12 and so constructed and arranged so as to receive the ribbon 15 on the generally cylindrical surface 19 of the roll 17. The rolls 17 and 18 are disposed in generally parallel axial relationship to each other and are disposed with their cylindrical surfaces adjacent. The rolls 17 and 18 are rotated in like direction as illustrated by the arrows by means of a support and rotating means 21. In association with the roll 17 is a temperature control means 23. A temperature control means 25 is in operative association with the roll 18. The polymer 15 forms a nip or bank of resinous material 27 disposed generally between the rolls 17 and 18. A source of strandular material 30 provides a filament or strand 31 which passes through the guide or tensioning device 33 into and through the bank of thermoplastic resinous material 27. A second source of strandular material 35 provides a second filament 37 which passes through the tensioning device 38 and through a set of pinch rolls 40. The pinch rolls 40 are driven by the driving means 41. The strand 37 is introduced into the bank of thermoplastic material 27 generally tangential to the bank and in a plane generally normal to the axis of the strand 31 passing through the bank 27. Passing from the bank 27 is a coated composite strand 45. The strand 45 passes into a shaping die 47 having a shaping orifice 48. A cooling device 50 is disposed generally adjacent the rolls 17 and 18. The cooling device 50 is adapted to remove heat from the composite strand 45. The composite strand 45 passes to a forwarding device 53. The device 53 comprises a pair of draw rolls 54 and 55, which are driven by the support and drive means 57. The composite strand 45 is delivered to a strand processing apparatus 59. As illustrated the processing device 59 is a cutter which produces chopped particles 61. In operative association with the extruder 12 and drive means 21, 41 and 57 is a speed control 63 by means of a line 65.

In operation of the apparatus shown in FIGURE 1, thermoplastic resinous material is provided by means of the extruder 12, a band of heat plasticized thermoplastic resinous material 15 is placed on the surface 19 of the roll 17, and the temperature of the roll 17 is maintained at a temperature sufficient to maintain the thermoplastic resinous material in a plastic flowable condition. The roll 18 is usually operated at a slightly lower temperature, the temperature differential between the rolls 17 and 18 being adjusted to maintain a band of the resinous material on the roll 17 and preferably, although not necessarily, maintain the surface of the roll 18 substantially free of adhering resinous material. The quantity of thermoplastic resinous material is regulated to provide a bank of the desired size through which the strand 31 is passed. The polymeric material adheres to the strand 31 and a portion of the polymeric material is carried along as a coating. The strand 37 enters the bank generally adjacent the surface of the resinous material 15 on the roll 17 and by the rotating motion of the bank induced by the rolls 17 and 18 is wound circumferentially around the strand 31. However, as the strand 31 is moving in a direction generally parallel to the axis of the rolls 17 and 18, the strand 37 is disposed as a helix about the strand 31.

FIGURE 2 depicts an end view of the rolls 17 and 18 and formation of the bank of FIGURE 1. Thus, as the resinous material 15 and the strands 31 and 37 are introduced to the roll assembly, they are coated with a thermoplastic resinous material and the strand 37 is provided with a helical configuration. The control and drive mechanism 41 driving the rolls 40 maintains the feed rate of the strand 37 at a suitable tension to give the desired helical configuration. The coated composite strand 45 on leaving the bank 27 optionally is passed through a shaping die 47 and a shaping orifice 48 wherein a desired cross sectional configuration is imparted to the strand if this is deemed necessary. Beneficially, the strand may be further processed, if desired. For example, in the case where each of the strands is fiber or filamentary glass which is embedded in a resin, by chopping the strand, molding granules are prepared. Molding granules prepared in this manner are particularly advantageous in that the glass roving is readily incorporated into the strand in a manner that provides a plurality of generally parallel strands which are not all oriented along the axis of the particle.

FIGURE 3 is a view of a portion of the composite strand 45 of FIGURE 1 illustrating the relationship between the strand 31, the strand 37, and a thermoplastic resinous matrix designated as 15a. The strand 37 is encapsulated within the resinous matrix and defines a helical path about the centrally disposed strand 31.

FIGURE 4 depicts an alternate embodiment of the invention generally designated by the reference numeral 70. The embodiment 70 comprises a plurality of rolls 71, 72, 73 and 74. Each of the rolls 71, 72, 73 and 74 are temperature controlled by means not shown. Adjacent the nip of the rolls 71 and 72 is disposed a thermoplastic resinous material supply 76 delivering a thermoplastic resinous material 77 to the nip of the rolls 71 and 72. The thermoplastic resinous material is heated by means of the rolls 71 and 72 to a heat plastified state forming a band 78 which is carried about the periphery of the roll 72 to the nip between the rolls 73 and 74. The band 78 is further kneaded in the nip 79 between the rolls 72 and 73 and pressed to a thinner layer about a portion of the circumference of the roll 73. Adjacent the roll 73 is a roll 74 rotating in a like direction and forming a bank 81 in the manner of the bank 27 of the apparatus of FIGURE 1. A strand 82 is passed through the bank in a direction generally parallel to the axis of the rolls 73 and 74. A second strand 83 is provided from the strand source 84 and a third strand 85 is provided from the strand source 86. The strands 83 and 85 are fed into the bank in a manner similar to strand 37 of FIGURES 1 and 2. Disposed adjacent to the bank 81 is a source of thermoplastic resinous material 87 delivering a strand of heat plastified thermoplastic material 89.

FIGURE 5 depicts an enlarged view of the bank 81, the strands 83, 85 and the thermoplastic resinous strand 89 being incorporated into a resultant composite strand 90. The composite strand 90 has a central core formed from the strand 82, two helically disposed strands from the strands 83 and 85 and where the thermoplastic resinous strand 89 is of contrasting color a helically disposed colored band generally adjacent the surface of the strand 90. In order to provide the colored material in a helical pattern about the strand 90 the strand 89 is added to the bank adjacent the side of the bank where the composite strand is removed. The embodiment depicted in FIGURES 4 and 5 is particularly adapted for use with a dry granular thermoplastic resinous feed material wherein it is not desired to utilize an apparatus such as an extruder to supply the resinous material.

FIGURE 6 is a partly in section view of an insulated wire 95 prepared by the method and apparatus of the invention. The wire 95 comprises a centrally disposed conductive strand 96 surrounded by a thermoplastic resinous matrix 97 having helically disposed therein and about conductor 96, filamentary reinforcements 98 and 99.

In FIGURE 7 there is illustrated an alternate embodiment of the invention generally designated by the reference numeral 102. The apparatus 102 comprises in cooperative combination a pair of cooperative rolls 104 and 105 adapted to rotate in the direction of the arrow. The roll 104 is divided into a heated portion 106 and a cooled portion 107. The portions 106 and 107 have a common cylindrical surface 108. The roll 105 is divided into a heated portion 110 and a cooled portion 111. The cooled portion 111 has a smooth cylindrical surface 113. The heated portion 110 of the roll 105 has disposed on the surface thereof at least one helically disposed land 115. The land 115 is so constructed and arranged so as to forward a thermoplastic material on the surface 115 toward the roll portion 111 when the roll 105 is rotated in the direction of the arrow. Adjacent the surface 115 of the roll 105 is a means 117 to supply a thermoplastic resinous material 119 in heat plastified form to the surface of the roll 105. The thermoplastic material 119 is carried on the surface 115 of the roll 110 and forms a rolling bank 120 between the roll portion 106 of the roll 104 and the surface 115 of the roll 105. A deformable strand 122 is supplied generally tangentially to the rolling bank 120 and is incorporated into the thermoplastic material forming the composite strand 123. The composite strand 123 enters comminuting apparatus 125.

FIGURE 8 illustrates a view of the strand 127 prepared by the apparatus 102 of FIGURE 7. The strand 127 comprises a thermoplastic resinous matrix 128 having incorporated therein a helically disposed flexible strand 129.

In operation of the apparatus of FIGURE 7 the thermoplastic resinous material is supplied substantially in the same manner as it is supplied in the apparatus of FIGURE 1. The rolling bank 120 however, differs in that it constantly is being moved by the action of the helically disposed land toward the cooled portion of the roll. The bank rotates and envelops the strand 122 in a helical configuration and is forwarded to the cooled portion of the rolls 111 and 107 where it is supported and cooled to a condition where it is self supporting and there is no tendency for the helical convolutions of the encapsulated strand to unwind. By employing the roll arrangement of the FIGURE 7 it is unnecessary to utilize a central core to cause displacement of the thermoplastic material from the rolling bank in an axial direction. Such a helical configuration permits considerably longer fibers to be incorporated within the granules and on molding confers considerably less directionality to the fabricated article and permits a greater degree of flexure while retaining the advantages of the fibrous reinforcement. Thus more flexible thermoplastic materials may be used to their utmost advantage filamentary reinforcing such as glass fiber and the like.

The method and apparatus of the present invention is employed with particular advantage for the preparation of granules of filamentary reinforced thermoplastic resinous material such as glass reinforced polystyrene, polyethylene, polyvinyl chloride, polypropylene and the like. Beneficially the dimensions and compositions of the strands and granules can be varied within wide limits as the feed ratio of the various constituents is varied. The pitch of the helix generally depends on the rate of rotation of the bank relative to the advancement of the central strand thereto. Thus, using a relatively slow rotation of the bank and a rapid advancement of the center strand, the helix generated will have a relatively long pitch. The composition of the strands is limited only by the stiffness of the tangentially added strands relative to the deformation which can be induced in them by the rotating polymer bank. The central core is not so limited and may vary from a rigid brittle material such as metal or glass to a soft filamentary roving. Filamentary thermoplastics may be utilized also as the central core if they are sufficiently heat resilient that they are not rendered fluid by the heat taken from the bank.

In operating the apparatus and practicing the method of the present invention, it is necessary that the thermoplastic resinous material be heated to a temperature at which it will flow readily, that is, a temperature sufficient to lower the flow viscosity of the material below about 15,000 centipoises. Further, the rate of withdrawal of the filamentary material from the bank of polymer must not be done at a rate sufficiently high to cause melt fracture. Generally it is desirable to adjust the temperature of the rolls and subsequently the rate of rotation thereof to provide a bank having a somewhat smooth appearance and no indication of roughness or graininess on the surface if a coating of maximum smoothness is to be obtained. As the temperature of the polymer is reduced the coatings tend to become thicker and the smoothness thereof decreases.

Usually for maximum convenience of operation it is desirable to operate the two rolls at somewhat different temperatures. As illustrated in FIGURE 1 it is desirable to maintain the roll 17 at a temperature higher than the roll 18 in order to maintain the bank in the location illustrated. Should the polymer adhere to the roll 18, the bank forms on the underside of the nip between the two rolls. Generally one of the rolls such as roll 18 of FIGURE 1 is treated with a release agent such as zinc stearate, lead stearate, various commercial silicone preparations and the like, this preventing adherence of the polymeric material thereto, even when the treated roll is at a higher temperature than the roll to which the bank adheres.

By way of further illustration, an apparatus substantially as illustrated in FIGURE 1 is prepared wherein the rolls 17 and 18 are six inches in diameter, and have a cylindrical face about two inches in length which are placed about 0.003 inch apart. The rolls are electrically heated. The roll 17 is driven at a speed of about 30 revolutions per minute and the roll 18 at a speed of about 24 revolutions per minute. A polyethylene having a molecular weight of about 100,000 is extruded as a thin ribbon onto the surface of the roll and the power input to the electrical heaters of the roll is adjusted to give a temperature of about 400° Fahrenheit to roll 14 and a temperature of about 210° Fahrenheit to roll 18, the polymer has a smooth creamy appearance and an apparent viscosity of about 2,000 centipoises. A 60 end strand of No. 150 fiberglass roving is passed through the bank of polymer between the rolls at a rate of about 40 feet per minute. A second fiberglass roving of like dimension is added tangentially to the bank at a rate of about 58 feet per minute. The resultant strand is cooled and has a centrally disposed fiberglass core and a helically disposed fiberglass roving surrounding the core, both rovings being embedded in the polyethylene. The resultant diameter of the strand is about 0.09 inch and it has a glossy appearance. The strand is then chopped into particles or granules having a length of about 3/16 of an inch, which is subsequently compression molded into a rectangular plate about 1/4 inch thick, 6 inches in length, and 3 inches in width. The physical properties of the resultant article are found to be superior to the properties obtained when granules having an equal quantity of glass fiber coaxially disposed within them are employed.

In a generally similar manner, polystyrene is employed to produce plastic encapsulated strands and particles such as are illustrated in FIGURES 3 and 6. When the fiberglass roving utilized for a central core of a strand was replaced with No. 18 copper wire, an insulated fiberglass covered wire was obtained. In a similar manner, other thermoplastic resinous compositions, including copolymers of polystyrene, such as those prepared from 85 percent styrene and 15 percent methyl acrylate, polyvinyl chloride, saran, ethyl cellulose, cellulose acetate, butyrate nylon, and the like, are readily utilized in the manner of the foregoing illustrations.

An apparatus substantially as illustrated in FIGURE 7 is constructed utilizing a pair of rolls 6 inches in diameter and having a length of 18 inches. The heated portion of the rolls is about 2 inches in length and is separated from the cooled section by a quarter inch of a rigid phenolic composition material. The heated portion of the roll 105 has disposed thereon a double thread helical land having a pitch of about 1/10 of an inch and land depth of 0.003 inch. The roll 105 is rotated at a speed of 27 revolutions per minute and the roll 104 at a speed of 30 revolutions per minute. A fiberglass yarn similar to the yarn used in the previous illustration was fed tangentially into a rolling bank of polystyrene. The cooled portions of the roll were maintained at a temperature of about 70° Fahrenheit by means of internal cooling water. The resultant strand had a diameter of approximately 3/32 of an inch and had the glass filament disposed therein in a helical manner. The smooth surface of the rolls 113 provides sufficient cooling to rigidize the resultant strand and allow comminution thereof at the terminal portion of the rolls 104 and 105 remote from the heated portion thereof. Similar beneficial and advantageous results are achieved when polyvinyl chloride, saran, polyethylene, ethyl cellulose and the like are employed.

As is apparent from the foregoing specification, the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:
1. A method of coating strandular material with a thermoplastic resinous material comprising providing a rolling bank of heat plastified thermoplastic resinous material at a thermoplastic temperature, disposed between a pair of rotating external surfaces, the bank having a first end and a second end, introducing a strand of material to be coated into the bank, withdrawing from one end of the bank a portion of the bank containing the strandular material to form a filament and subsequently cooling the filament or strand below the thermoplastic temperature.

2. A method of preparing a thermoplastic resinous strand having included therein a helically disposed strandular element comprising providing a rolling bank of a heat plastified thermoplastic resinous material at a thermoplastic temperature, the bank being disposed between rotating external surfaces, the bank having a first end and a second end, continuously supplying thermoplastic resinous material to the rolling bank, continuously moving the material in the rolling bank away from the second end and toward the first end, introducing into the rolling bank in a generally tangential manner a flexible strand at a rate greater than the movement of the bank from the second end to the first end, and sufficient to permit the strand to be disposed in a helical manner within the bank, removing from the first end of the bank a portion thereof to form an elongated strand and subsequently cooling the strand below the thermoplastic temperature, thereby providing a rigid thermoplastic resinous strand having helically disposed therein a filamentary article.

3. A method of coating strandular material with a thermoplastic resinous material comprising providing a rolling bank of a heat plastified thermoplastic resinous material at a thermoplastic temperature, passing a strand to be coated through the rolling bank in a direction substantially parallel to the axis of rotation of the bank, introducing a second strand of material tangentially into the bank and simultaneously withdrawing the strands from the bank, the relative feed rates of thermoplastic resinous material to the rolling bank and the feed rate of the strands, being maintained in such relationship that the second strand is disposed in a helical manner about the first strand and is embedded within the thermoplastic resinous coating.

4. The method of claim 3 wherein the second strand is maintained in spaced relationship about the first strand.

5. The method of claim 3 wherein the thermoplastic resinous material is maintained in a rolling or rotating bank by means of a pair of generally cylindrical surfaces rotating about parallel axes.

6. The method of claim 3 including the step of shaping the coated article while the coating is still in the thermoplastic condition.

7. The method of claim 3 including the step of cooling and comminuting the strandular article into a plurality of particles.

8. An apparatus for coating strandular articles comprising in cooperative combination a pair of rolls, the rolls adapted to rotate on about generally parallel axes, the rolls each having an external generally cylindrical surface, the pair of rolls comprising a first roll and a second roll, each of the rolls having a first end and a second end, the first ends and the second ends being adjacent to each other, the first end of the first roll having disposed thereon at least one helical land adapted to move a material on the surface of the roll toward the second end thereof, the first ends of the first and second rolls having means to maintain the temperature thereof sufficiently high to maintain a thermoplastic resinous material in a heat plastified condition, the second ends of the rolls having means to maintain their temperature below the thermoplastic temperatures of a thermoplastic resinous material, means to provide a flexible strandular article to the first ends of the rolls and means to provide a heat plastified thermoplastic resinous material thereto.

9. An apparatus for coating strandular articles comprising in cooperative combination a pair of rolls, the rolls adapted to rotate about generally parallel axes, the rolls each having an external generally cylindrical surface, the cylindrical surfaces being in spaced adjacent relationship, means to rotate the rolls in like direction, means to maintain the rolls at a desired temperature, means to supply a thermoplastic resinous material to at least one of the rolls, means to supply a strandular article to be coated, said strandular article to be coated being positioned generally between the rolls, means to supply a second strandular article in a direction generally normal to the direction of the first strandular article, and to approach the first strandular article generally adjacent the cylindrical surfaces of the rolls, the apparatus being so constructed and arranged so that when thermoplastic resinous material is fed to the rolls the first strandular article is cooled thereby and the second strandular article is helically disposed about the first strandular article and embedded within the thermoplastic resinous coating.

10. The apparatus of claim 9, including means to draw the strandular article from the rolls.

11. The apparatus of claim 9 including means to shape and cool the resultant coated article.

12. The apparatus of claim 9, including means to comminute the resultant shaped article.

13. The apparatus of claim 9 wherein the means to supply the thermoplastic resinous material is an extruder.

14. The apparatus of claim 9 wherein the means to supply thermoplastic resinous material comprises a plurality of heated rolls.

References Cited by the Examiner

UNITED STATES PATENTS

| | | | |
|---|---|---|---|
| 1,797,249 | 3/1931 | Truesdale et al. | 57—7 |
| 2,224,274 | 12/1940 | Powers | 57—153 |
| 2,262,861 | 11/1941 | Rugeley et al. | 57—153 X |
| 2,322,773 | 6/1943 | Peters | 57—149 X |
| 2,369,876 | 2/1945 | Warren | 57—149 X |
| 2,427,507 | 9/1947 | Powell et al. | 57—162 X |
| 2,509,894 | 5/1950 | Toulmin et al. | 57—149 |
| 2,731,069 | 1/1956 | Horn | 57—164 X |
| 2,760,229 | 8/1956 | Cheney et al. | 118—420 |
| 2,894,366 | 7/1959 | Leckie | 57—149 |
| 2,904,846 | 9/1959 | Smith | 18—59 |
| 2,934,885 | 5/1960 | Dunbar et al. | 57—162 |
| 3,048,078 | 8/1962 | Kaplan | 57—162 X |
| 3,064,414 | 11/1962 | Kiyoshi Ando | 57—162 |
| 3,137,120 | 6/1964 | Bundenbender | 57—162 |

FRANK J. COHEN, *Primary Examiner.*

MERVIN STEIN, *Examiner.*

D. E. WATKINS, *Assistant Examiner.*